(12) United States Patent
Baldwin

(10) Patent No.: US 6,636,269 B1
(45) Date of Patent: Oct. 21, 2003

(54) VIDEO TIMING SYSTEM AND METHOD

(75) Inventor: James A. Baldwin, Emerald Hills, CA (US)

(73) Assignee: Webtv Networks, Inc., Mountain View, CA (US)

( * ) Notice: Subject to any disclaimer, the term of this patent is extended or adjusted under 35 U.S.C. 154(b) by 0 days.

(21) Appl. No.: 09/377,300

(22) Filed: Aug. 18, 1999

(51) Int. Cl.$^7$ .............................. H04N 7/00; H04N 9/64
(52) U.S. Cl. ...................... 348/500; 348/510; 348/512; 348/516
(58) Field of Search ................................. 348/497, 500, 348/510–518, 714, 501, 536, 194; 375/372; 386/111, 112; 369/60.01; H04N 7/00, 9/64

(56) References Cited

U.S. PATENT DOCUMENTS

| | | | | |
|---|---|---|---|---|
| 4,951,143 A | * | 8/1990 | Waehner | 348/513 |
| 5,148,417 A | * | 9/1992 | Wong et al. | 360/78.11 |
| 5,335,074 A | * | 8/1994 | Stec | 348/441 |
| 5,432,769 A | * | 7/1995 | Honjo | 369/47.33 |
| 5,671,260 A | * | 9/1997 | Yamauchi et al. | 348/500 |
| 5,689,313 A | * | 11/1997 | Sotheran | 345/536 |
| 5,696,527 A | * | 12/1997 | King et al. | 345/634 |
| 5,805,173 A | * | 9/1998 | Glennon et al. | 345/501 |
| 5,831,673 A | * | 11/1998 | Przyborski et al. | 348/239 |
| 5,861,879 A | * | 1/1999 | Shimizu et al. | 345/204 |
| 5,990,967 A | * | 11/1999 | Kawakami et al. | 348/500 |
| 6,088,063 A | * | 7/2000 | Shiba | 348/500 |
| 6,177,922 B1 | * | 1/2001 | Schiefer et al. | 345/213 |
| 6,317,161 B1 | * | 11/2001 | Renner et al. | 327/147 |
| 6,324,235 B1 | * | 11/2001 | Savell et al. | 375/372 |
| 6,326,960 B1 | * | 12/2001 | Wolf | 345/212 |
| 6,335,728 B1 | * | 1/2002 | Kida et al. | 315/169.4 |
| 6,339,601 B1 | * | 1/2002 | Seong et al. | 370/503 |
| 6,351,165 B1 | * | 2/2002 | Gregorian et al. | 327/156 |
| 6,380,981 B1 | * | 4/2002 | Kasezawa et al. | 348/513 |

* cited by examiner

Primary Examiner—John Miller
Assistant Examiner—Brian Yenke
(74) Attorney, Agent, or Firm—Workman, Nydegger & Seeley

(57) ABSTRACT

A video timing system and method. The method typically includes receiving from an input video stream an input video field in a video buffer, transmitting an output video field from the video buffer to an output video stream, measuring a time interval between a predetermined point on the input video field and a predetermined point on the output video field, and altering timing of the output video stream where the time interval is outside a predetermined range.

49 Claims, 11 Drawing Sheets

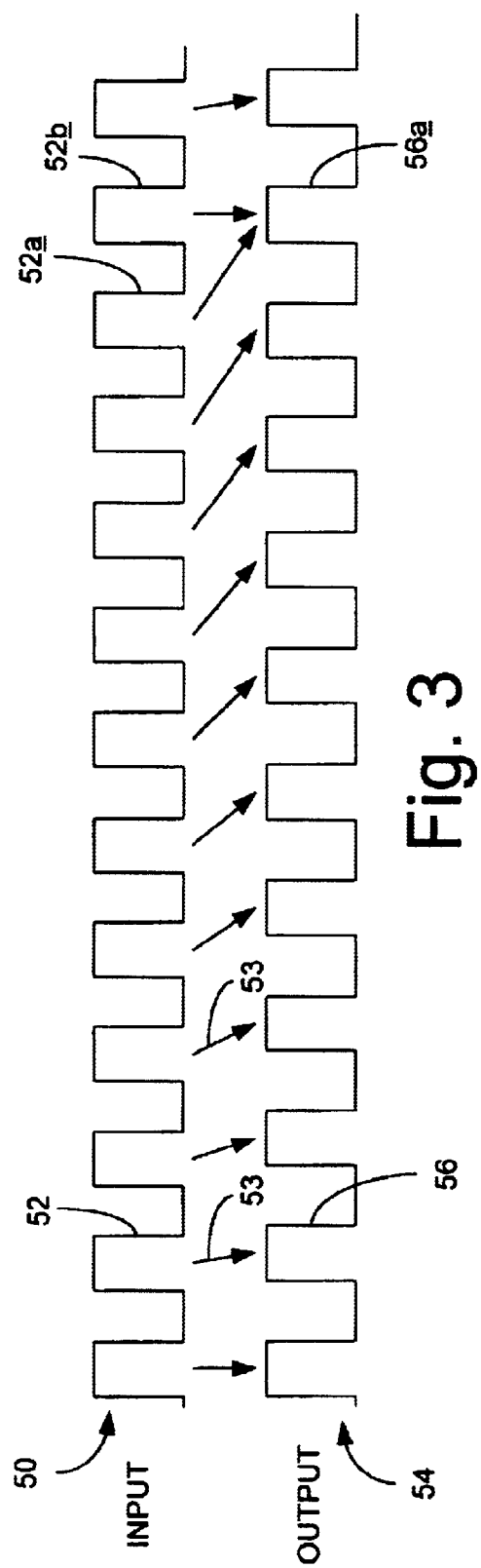
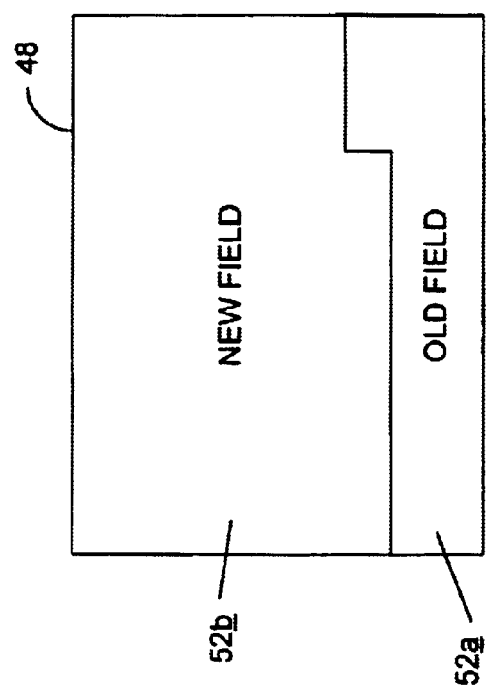
Fig. 5
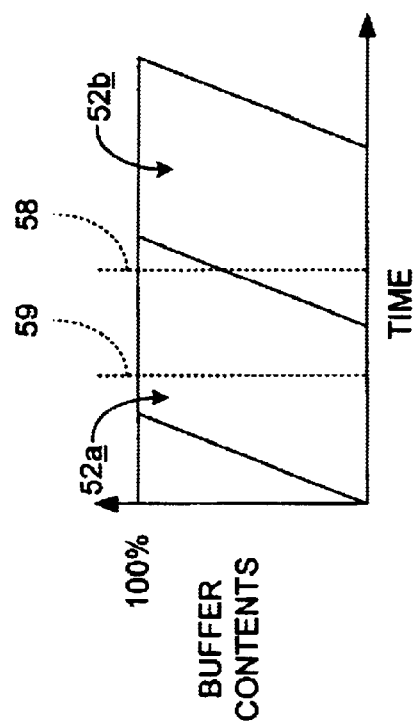
Fig. 3
Fig. 4

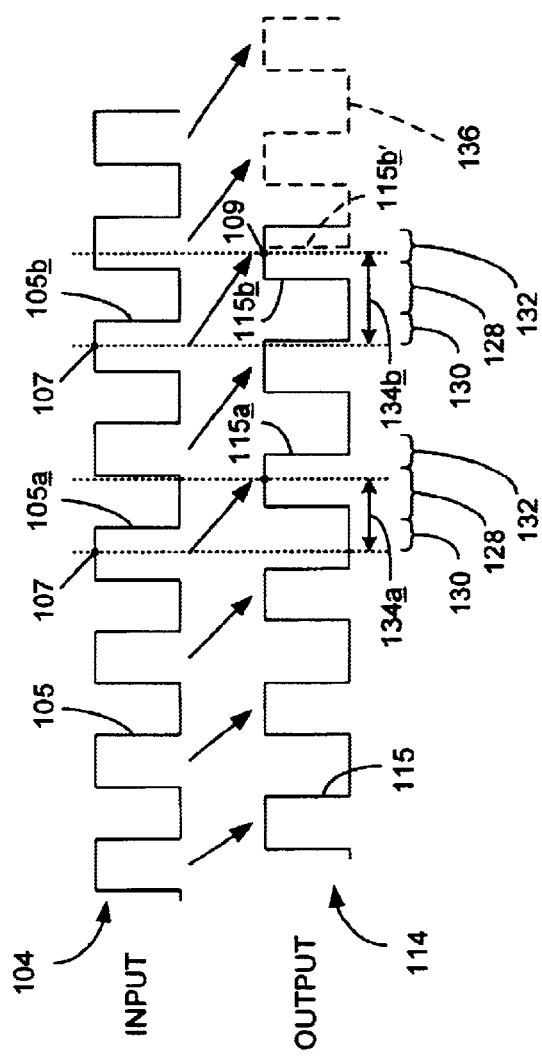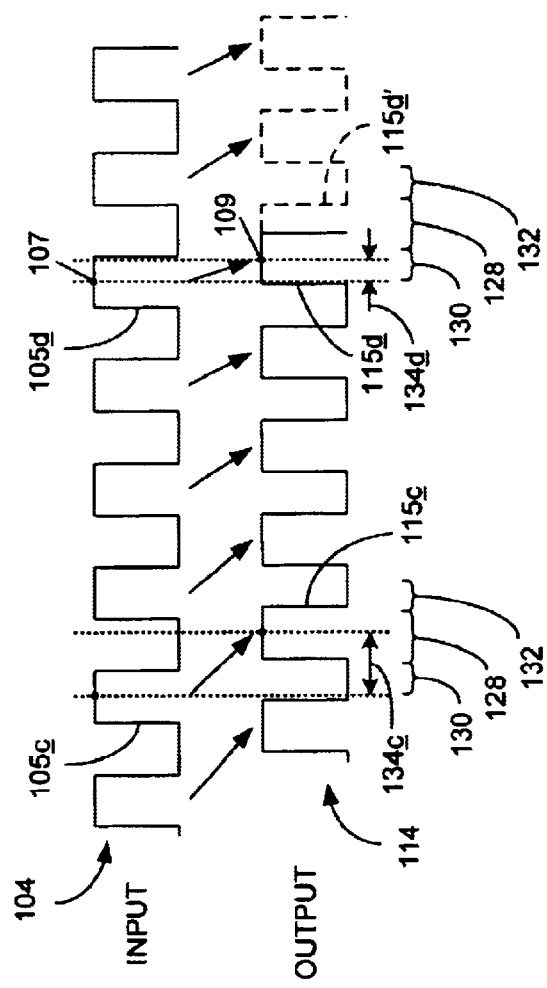

VIDEO TIMING SYSTEM AND METHOD

TECHNICAL FIELD

The present invention relates generally to video, and more particularly to a timing system and method for processing video signals.

BACKGROUND OF THE INVENTION

To create a moving image on a typical video display, every sixtieth of a second, an electron beam traverses the display pixel by pixel in successive horizontal passes from right to left, progressing from top to bottom of the display. Odd-numbered lines are traversed on one scan of the display. Even-numbered lines are traversed on the next scan of the display. By convention, a single scan by the electron beam across either the odd or even lines of the display is referred to as a video field, and two successive scans across both odd-and even-numbered lines on the display are referred to as a video frame, such that two interlaced video fields form a video frame.

A typical National Television Systems Committee (NTSC) standard video frame includes 525 lines, of which approximately 484 are viewable. Lines numbered 1–262.5 contain the odd field, and lines 262.5–525 contain the even field. Typically, the first 21 lines of each field do not include video content, to allow time for the electron beam to travel to the top of the display, and to provide for transmission of data, such as closed captioning, within the video field. The period during which the beam travels to the top of the display is referred to as the vertical blanking interval.

Each second, the electron beam scans approximately 15,734 horizontal lines. At this rapid scan rate, it is crucial that the display remain synchronized with the video signal so that the video information is displayed in precisely the correct location. For this purpose, synchronization pulses are embedded within each video field. At the end of each line, a horizontal sync pulse instructs the electron beam to return to the beginning of the next line. During each vertical blanking interval, a vertical sync pulse instructs the electron beam to travel to the top of the display to begin scanning a new video field. If the timing of these pulses substantially varies from NTSC standards, the resulting picture will be misaligned.

Video signal sources, such as video cassette players, television broadcasts, video cameras, etc., typically transmit video signals according to a locally generated time base. In a video cassette player, for example, the time base is created by the mechanical motion of the playback heads reading video information from the videotape. Each local time base is ideally set to operate at the NTSC standard scanning rate of 29.97 frames per second. However, inherent imperfections in each time base, caused by, for example, internal clock error, stretching of a video tape, or mechanical vibrations within a tape transport mechanism, will result in slightly varying frame rates for each device.

Several timing related picture defects are known to occur in current video systems. First, when a video display initially receives a new video signal or switches from one video source to another, it may take a few moments for the display to synchronize with the time base of the new video signal. During this time, a phenomenon referred to as "picture roll" may occur, where the picture appears to roll rapidly upward on the display. Picture roll is typically viewed when switching between channels on a television set.

In addition, a phenomenon referred to as "video tearing" occurs where an input video stream is supplied to a video buffer according to one time base, and an output video stream is produced by a video generator from the contents of the video buffer according to another time base. While the time bases may be closely aligned, the above-described inherent imperfections in each time base will result in differences between the frame rates of the input and output video streams. For example, the input stream may supply 1000 frames for every 1004 frames produced in the output stream.

If the video generator attempts to transmit a new field from the video buffer before the input video stream has fully loaded the new field into the buffer, the video generator will transmit the contents of the buffer while it contains only a portion of the new field, and a portion of an old field. The resultant visual effect on the display is that part of the new field and part of the old field are displayed. Tearing can manifest itself as a single broken frame, or can occur in several consecutive frames, appearing as a rapid wiggle in the video picture.

Picture roll and video tearing are common problems in multimedia systems that combine video and computer graphics for simultaneous presentation on a single display. One such multimedia system is the WEBTV system available from WEBTV Networks of Santa Clara, Calif. The WEBTV system includes a set-top box, which typically is configured to display a graphical user interface for accessing email and Internet sites, along with television broadcasts, on a single screen. Though particular reference is made hereafter to set-top boxes for explanatory purposes, it should be understood that the problems associated with combining graphics and video are generally experienced in a wide variety of multimedia systems.

To combine graphics and video, a video buffer within the set-top box typically receives an input video stream from a television broadcast source. A video generator combines this input video stream with computer graphics generated within the set-top box. The video generator produces an output video stream according to a local time base and transmits the output video stream to an associated display. In this manner, the set-top box is able to display television programs while simultaneously displaying graphical information.

Several methods may be used to combine the input television stream and computer graphics. First, the television signal may be unsynchronized with the time base of the set-top box. In this case, the input video signal will be delivered to the video buffer according to the remote time base of the television broadcast, and taken from the video buffer according to the local time base of the video generator within the set-top box. As described above, inevitable variations between the remote and local time bases will result in video tearing. The wiggle effect produced by the tearing is distracting to the user, potentially making the picture difficult to see and the text difficult to read.

To control video tearing, the television broadcast source and the video generator may be synchronized by making one a slave to the time base of the other, or by making both slaves to an external time base, such that the frame rates of the television broadcast and the set-top box match exactly. One common video synchronization standard known in the video industry is the generator locking (genlock) standard. Genlock systems are commonly used in video studios in conjunction with a house sync signal, and can produce extremely accurate synchronization of various video devices.

Syncing a television broadcast source to an individual user's set-top box, of course, is impractical due to the distance between the user and the television broadcast source, and the multiplicity of users that tune into a given television broadcast. Syncing the video generator of the set-top box to the time base of the television broadcast is a feasible option for eliminating the video tearing problem. However, such an arrangement would cause the entire display of the set-top box, including the computer graphics portion, to experience picture roll when the television channel is changed. Screen-wide picture roll is distracting to the user, and makes the computer graphics portion of the screen difficult to read while changing television channels.

Finally, the set-top box may utilize a device known as a time base corrector to prevent video tearing. A time base corrector typically includes video buffers configured to store two input video frames, and a video generator with an internal time base. The time base corrector generates an output video stream based on the internal time base, and avoids video tearing by sending only the most recent video frame that has bee fully loaded into the buffers to the output stream. If, after displaying a first frame, a second video frame is not completely loaded into a buffer, the time base corrector redisplay the first frame. If two frames have been loaded since the last transmission of an output frame, the time base corrector will drop the oldest frame, and display only the most recent frame.

While the time base corrector does eliminate video tearing, it has the disadvantage of requiring two full frames of video buffer memory, which is unnecessarily costly. In addition, the time base corrector displays video that may be "jerky" due to the fact that frames are periodically dropped and redisplayed to avoid video tearing.

SUMMARY OF THE INVENTION

The invention provides a video timing system and method. The system includes a video buffer configured to receive an input video field from an input video stream, a video generator coupled to the video buffer, the video generator being configured to transmit an output video field in an output video stream, and a timer configured to measure a time interval between the input video field and the output video field. The video generator is configured to alter the timing of the output video stream if the time interval is outside a predetermined range. The video generator typically is configured to alter the timing of the output stream after a last viewable line of the output video field.

The method typically includes receiving from an input video stream an input video field in a video buffer, transmitting an output video field from the video buffer to an output video stream, measuring a time interval between a predetermined point on the input video field and a predetermined point on the output video field, determining whether the time interval is outside a predetermined range, and, if so, altering timing of the output video stream. The method typically involves altering timing after a last viewable line of the output video field.

BRIEF DESCRIPTION OF THE DRAWINGS

FIG. 3 is a view of an output video stream created from an input video stream having a higher frame rate.

FIG. 4 is a graph of buffer contents versus time for two video fields.

FIG. 5 is a view of a video display that demonstrates video tearing.

FIG. 10 is a view of an output video stream created from an input video stream having a higher frame rate, according to the present invention.

FIG. 11 is a view of an output video stream created from an input video stream having a lower frame rate, according to the present invention.

DETAILED DESCRIPTION OF THE INVENTION

Figure 1:
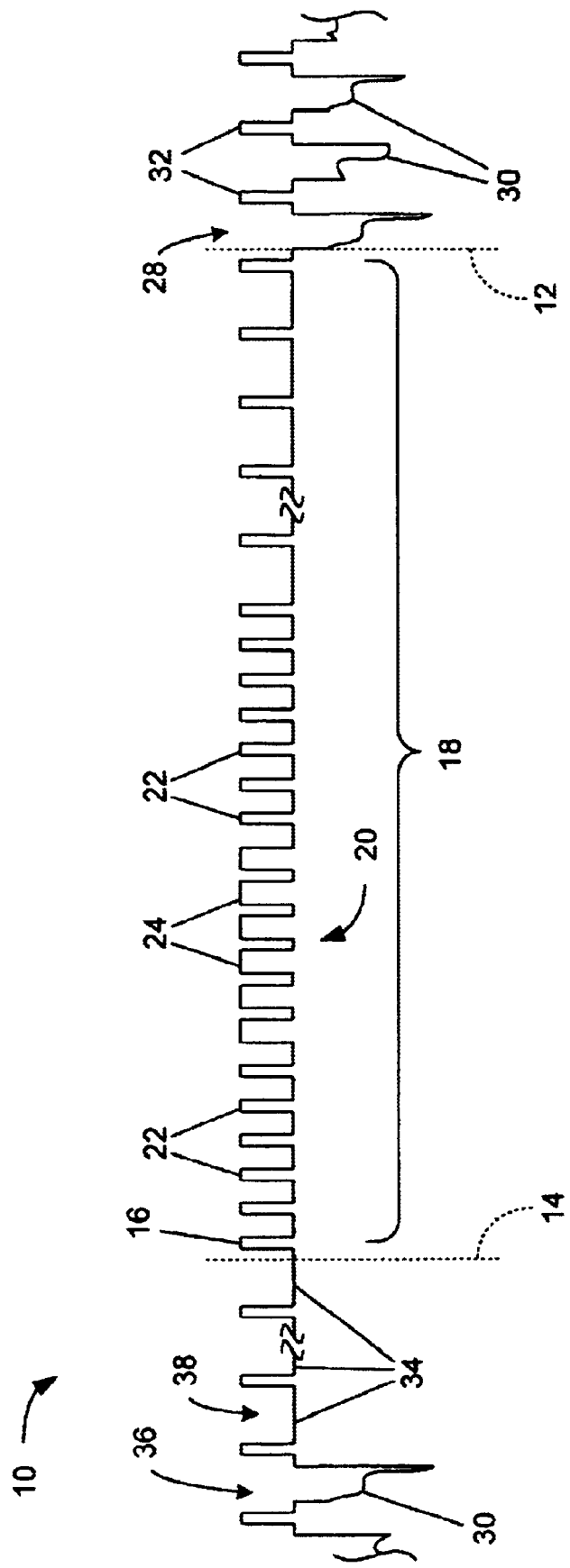
FIG. 1 is a view of video field signal.

Referring now to FIG. 1, a video field signal for one video field is shown at By way of example only, the present invention will be described utilizing a NTSC video signal, used in North America and Japan. Those skilled in the art will appreciate that virtually any other format also may be used, including the PAL standard widely used in Europe and Asia, SECAM standard used in France and the former Soviet Union, and High Definition Television (HTDV) standard. The signal also may be in a format used with computer displays, and may be interlaced or noninterlaced.

As used herein, the term "frame" refers to a scan of the electron beam over all of the horizontal lines on the display to produce a single image, and the term "field" refers to a single top-to-bottom scan over a subset of the horizontal lines on the display, whether the display uses interlaced scanning as described above at a ratio of two fields per frame, or at some other ratio of fields per frame. A field also may occupy an entire frame, such as where the electron beam covers every line of the display on a single scan. This is referred to generally as 1:1, or progressive scanning. Field is used herein interchangeably to refer to the displayed field, as well as the video field signal.

In FIG. 1, dashed line 12 indicates the top of display, and dashed line 14 indicates the bottom of the display. By convention, the start of video field signal 10 is indicated at 16, which is numbered line 0/262.5 in the odd field and 262.5/525 in the even field. Line 16, like lines 22 and 24, is referred to as a half pulse because it has a period half as long as picture-containing lines such as 28 and 36.

At the start of the video field signal, the electron beam is at the bottom of the display. To move the electron beam to the top of the display, the signal includes a vertical blanking interval 18. Vertical blanking interval 18 includes a vertical sync pulse which instructs the electron beam to travel to the top of the display at the proper time. Vertical sync pulse 20 includes a series of narrow serration pulses 22 on either side of a series of broad serration pulses 24. The change from narrow to broad, and back, is detected by the display and used to time the motion of the electron beam to the top of the display. No viewable pixel information is transmitted to the display during the vertical blanking interval. Following the vertical sync pulse, there are multiple blank lines 26 that contain no pixel information, but may contain other data, such as closed captioning data.

The first viewable line at the top of the display is indicated at 28. For each viewable line, the video field signal 10 includes pixel information 30 for one horizontal display line followed by a horizontal sync pulse 32. Pixel information 30 is displayed by the electron beam as it scans the appropriate line of the display. Once the electron beam reaches the end of the line, horizontal sync pulses 32 instruct the electron beam to return to the beginning of the next horizontal line. The horizontal sync pulses, in cooperation with the vertical sync pulse, form a timing structure for the video field signal.

The last viewable line at the bottom of the display is indicated at 36. Video field signal 10 also may include a plurality of overscan lines 34 after the last viewable line 36. These overscan lines are not viewable on a typical television display, but may be viewed on certain test equipment. Overscan lines 34 typically are blank, and contain no pixel information. Line 38 is the first line after the last viewable line 36. Typically, line 38 is a full-pulse overscan line. Alternatively, no overscan lines may be used and line 38 may be a half-pulse in duration such as the line indicated at 16, and may be within the vertical blanking interval. As will be described, line 38 typically is used to implement a timing alteration of the video field signal according to the present invention. The timing alteration typically involves altering the timing structure of the video field, by shifting the timing or phase of the horizontal and vertical sync pulses within at least a portion of the video field signal.

Figure 2:
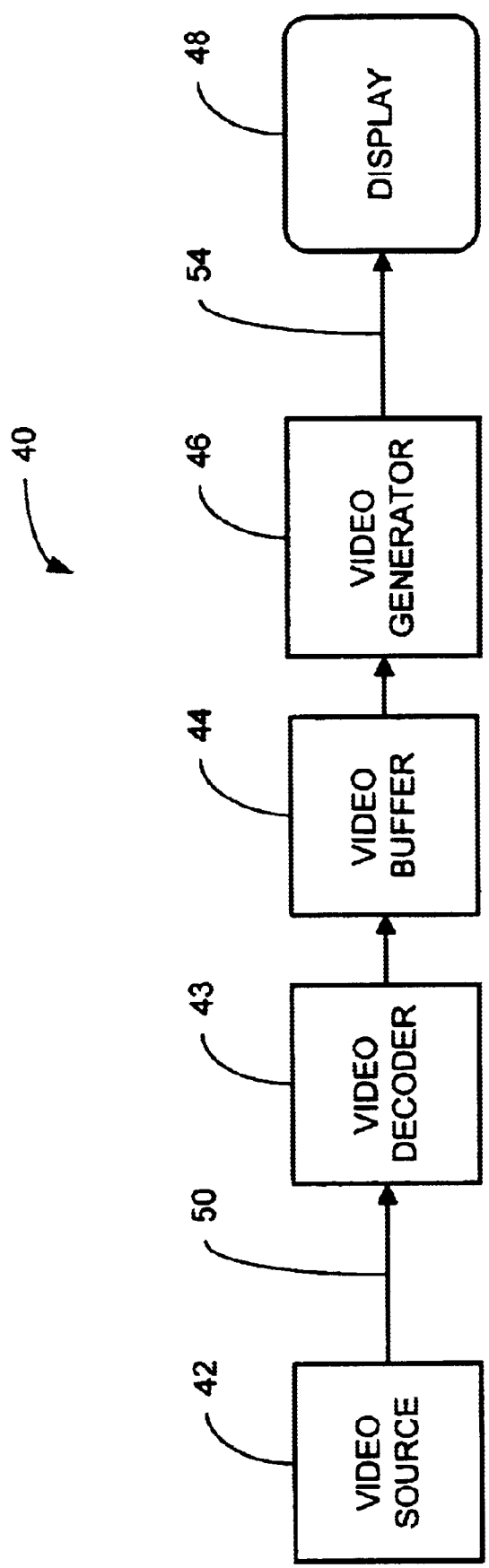
FIG. 2 is a schematic view of a video buffering system.

FIG. 2 shows a video buffering system 40 configured to buffer the video field signal 10 of FIG. 1. Video buffering system 40 includes a video decoder 43 configured to receive an input video stream 50 of input video fields from an input video source 42. The video decoder 43 decodes active video information from the input video fields. Active video information is information that is displayed on a screen, and includes pixel information, closed captioning information, etc. Timing pulses such as the horizontal and vertical sync pulses are not included in active video information. Video buffer 44 is configured to temporarily store the input fields of active video information. A video generator 46 reads the active video information in the video buffer, and produces output video fields based on the active video information, according to a local time base associated with the video generator, by generating appropriate timing pulses and integrating them with the active video information. The video generator transmits the output video fields in an output video stream 54 to display 48.

FIG. 3 shows the conversion of the input video stream 50 to the output video stream 54 according to the video buffering system of FIG. 2. Input video stream 50 includes a sequence of input video fields 52, and output video stream 54 includes a sequence of output video fields 56. Video fields 52 and 56 are shown as square waves for purposes of illustration only. Typically, each of video fields 52 and 56 is a waveform such as video field signal 10, described above and depicted in FIG. 1.

Output video stream 54 is generated by temporarily storing active video information of input fields 52 in buffer 44 and using video generator 46 to produce output fields 56 by reading the active video information from the buffer. Arrows 53 indicate the path of the input fields as they are converted to output fields by the video generator. In FIG. 3, the frame rate of input video stream 50 is faster than the frame rate of output video stream 54.

FIG. 4 depicts loading of consecutive input video fields into video buffer 44, each loading operation being represented by a diagonal line. As shown in FIG. 4, an input video field is not loaded instantaneously into the video buffer, but arrives over time, until data for the entire video field has been received by the buffer. The buffer loading time is exaggerated for purposes of clarity in FIG. 4. Typically, an input video field is loaded in approximately 2–10 microseconds.

Buffer 44 does not erase itself between fields, but simply rewrites a new field over an old field. Therefore, at the time indicated at dashed line 58, a portion of old field 52a and a portion of new field 52b are contained within the buffer. As described above, video generator 46 will attempt periodically to send the contents of the buffer to the output video stream before the input video field has been loaded completely into the buffer, such as at time 58, resulting in video tearing. If the video generator attempts to send the contents of the video buffer to the output stream at time 58 to create output field 56a, it will send a portion of field 52a and a portion of 52b from the buffer. The result is that a tear will appear across the display 48 between the two fields, as shown in FIG. 5. To avoid such a tear, the contents of the buffer may be sent to the output stream at a time when the buffer includes only one uninterrupted field, as shown at dashed line 59.

Figure 6:
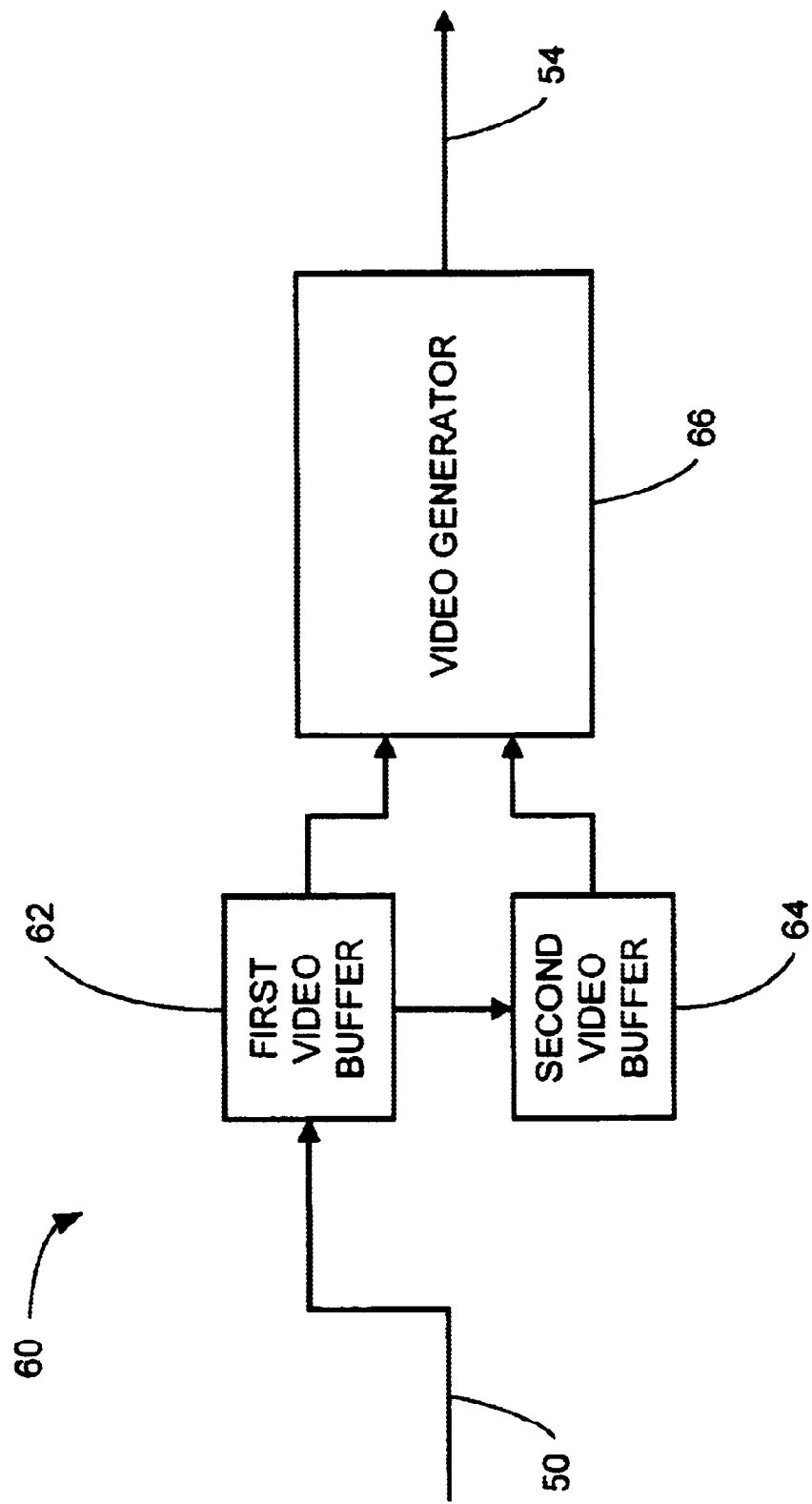
FIG. 6 is a schematic view of a prior art time base corrector.

In FIG. 6, a prior art time base corrector is shown generally at 60. Time base corrector 60 includes a first video buffer 62 and a second video buffer 64. As each field arrives in input video stream 50, it is stored in the first video buffer, then passed to the second video buffer as the next field arrives, such that the two most recently received fields always are buffered.

Time base corrector 60 also includes a video generator 66 that creates an output video stream according to an independent time base associated with the time base corrector. Typically, the independent time base is an internal clock. Alternatively, the independent time base may be an external clock.

Figure 7:
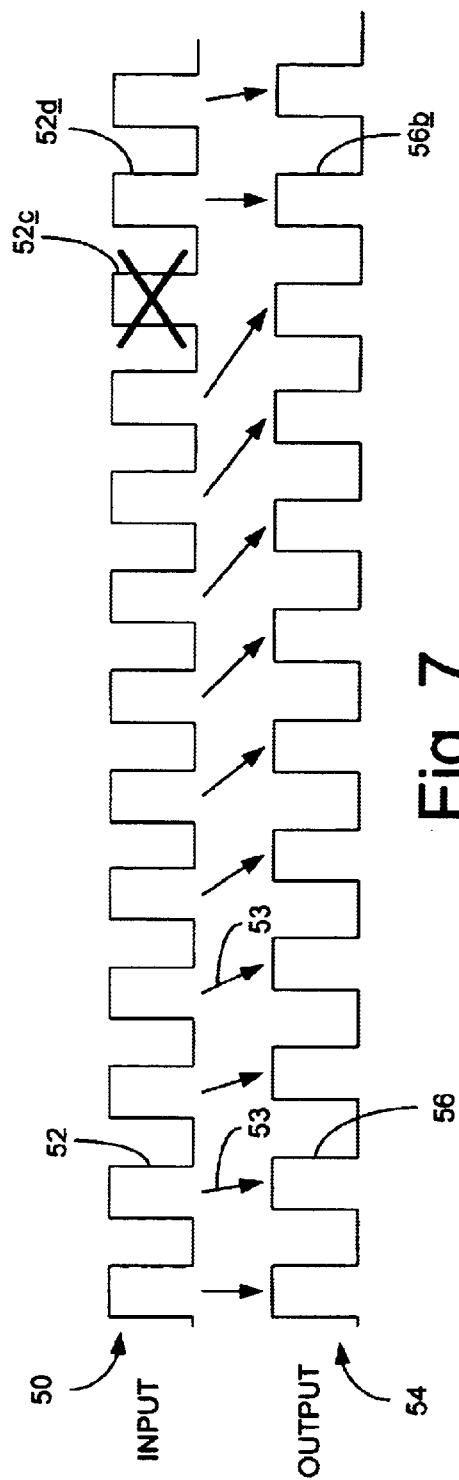
FIG. 7 is a view of an output video stream created from an input video stream having a higher frame rate, according to the prior art time base corrector of FIG. 6.
Figure 8:
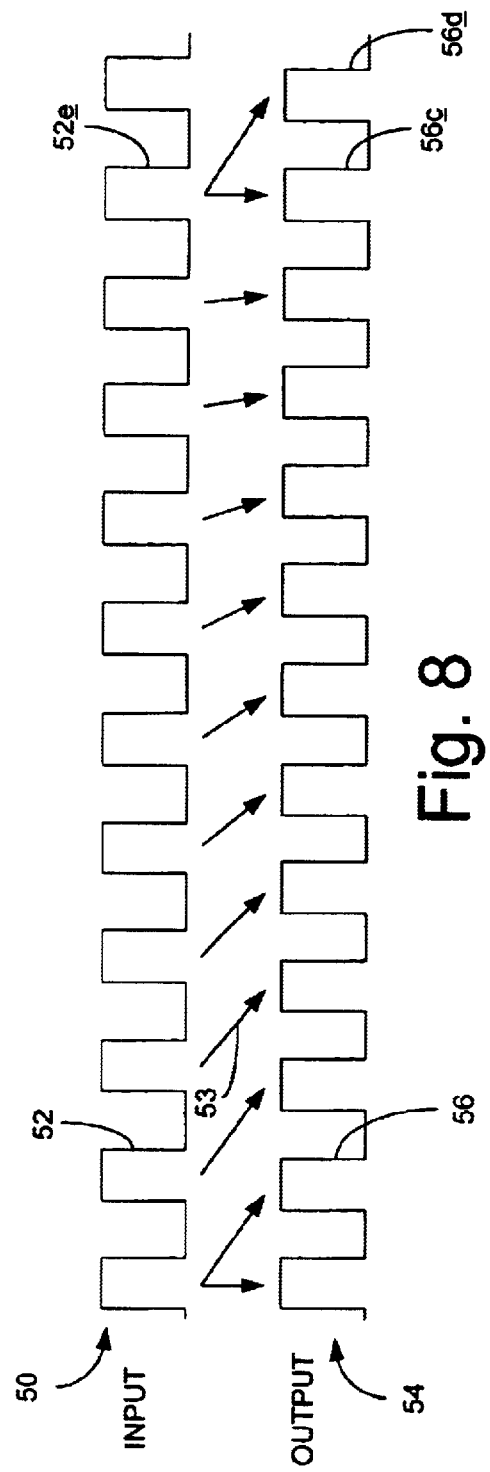
FIG. 8 is a view of an output video stream created from an input video stream having a lower frame rate, according to the prior art time base corrector of FIG. 6.

As shown in FIG. 7, where the frame rate of the input video stream is faster than the frame rate of the output video stream, the time base corrector drops an input video field 52c to avoid video tearing. Input video field 52d is sent to the output stream as output video field 56b. In FIG. 8, where the input video stream has a slower frame rate than the output stream, the time base corrector repeats input video field 52e as output video fields 56c and 56d to catch up. Thus, the time base corrector simultaneously must store the two most recently received video fields because it cannot detect ahead of time whether it will need to repeat a field.

As described above, the time base corrector has two basic problems. First, it is expensive because it requires enough buffer memory to store two separate video fields. Second, it may produce "jerky" output because fields are dropped and repeated.

Figure 9:
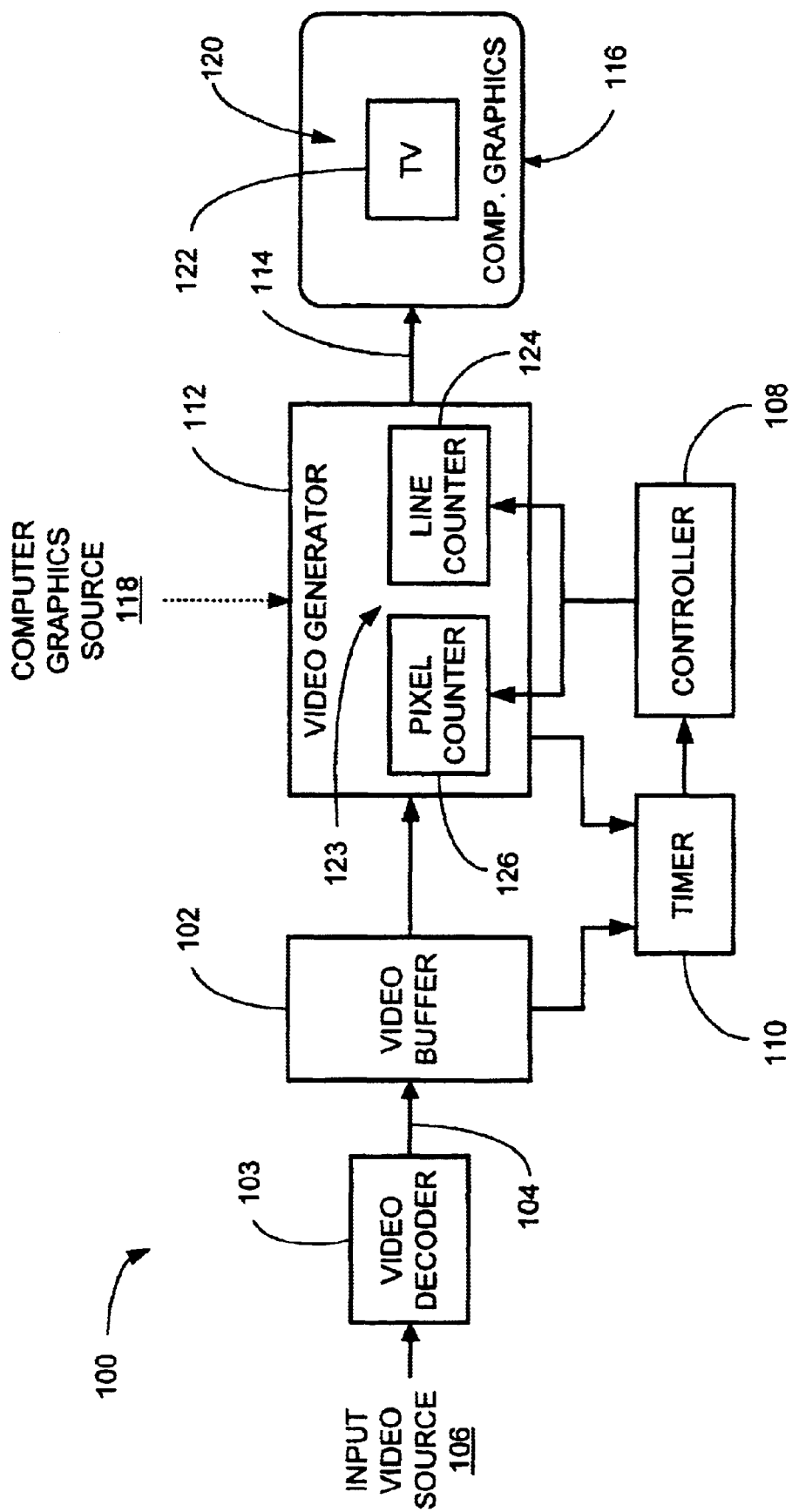
FIG. 9 is a schematic view of a video timing system according to the present invention.

Referring now to FIG. 9, a video timing system according to the present invention is shown generally at 100. Video timing system 100 typically includes a buffer 102 configured to receive a video field from an input video stream 104. The input video stream is transmitted to buffer 102 from an input video source 106, which typically has a remote, independent time base. Video decoder 103 typically decodes active video information from the input video stream for delivery to buffer 102.

To conserve memory, and lower manufacturing costs, buffer 102 typically requires only enough memory to store one video field at a time. Alternatively, the buffer may be configured to store multiple fields, or only part of a field at a time.

Video timing system 100 also includes a video generator 112 configured to produce an output video stream 114 from the input video fields in buffer 102 for display on display 116. Output video stream 114 typically is generated according to a local time base associated with the video generator. Display 116 may be a NTSC compliant television or virtually any other type of video display, including a television of a format such as PAL (Phase Alternation Line), SECAM (Sequential Couleur avec Memoire), or High Definition Television (HDTV). A computer monitor also may be used. A computer graphics source 118 also may be associated with video generator 112, such that on display 116 video generator 112 may produce a computer graphics portion 120, and a broadcast television portion 122.

The video timing system 100 also typically includes a position indicator 123 associated with video generator 112. The position indicator acts as a pointer to indicate to the video generator a location within the buffer 102 corresponding to a particular pixel of the input video field in the buffer. Typically, the position indicator includes a line counter 124 and a pixel counter 126. Alternatively, the position indicator may be a single pixel counter, or some other combination of counters configured to reference the pixel information in the buffer.

The pixel and line counters are driven by an internal clock, and typically increase at the NTSC standard field rate of approximately 59.94 fields per second, or 81 nanoseconds per pixel. The video generator is synchronized to the rate of the pixel and line counters. As the counters increase, the video generator reads, pixel by pixel, the input video field in the buffer and produces a corresponding output video field. Each of the pixel and line counters is configured to be writable, such that the value in the counter may be adjusted.

Video timing system 100 also includes a controller 108 associated with the video buffer 102 through a measurement circuit or timer 110 and coupled to each of the line and pixel counters 124, 126. Controller 108, timer 110, and video generator 112 are shown as separate components; however it will be understood that they may be integrated into a single piece of hardware, such as an application-specific integrated circuit (ASIC) The pixel and line counters, as well as the timer, controller, and video generator typically are implemented in hardware, however any one of these components may be implemented in software.

Figure 14:
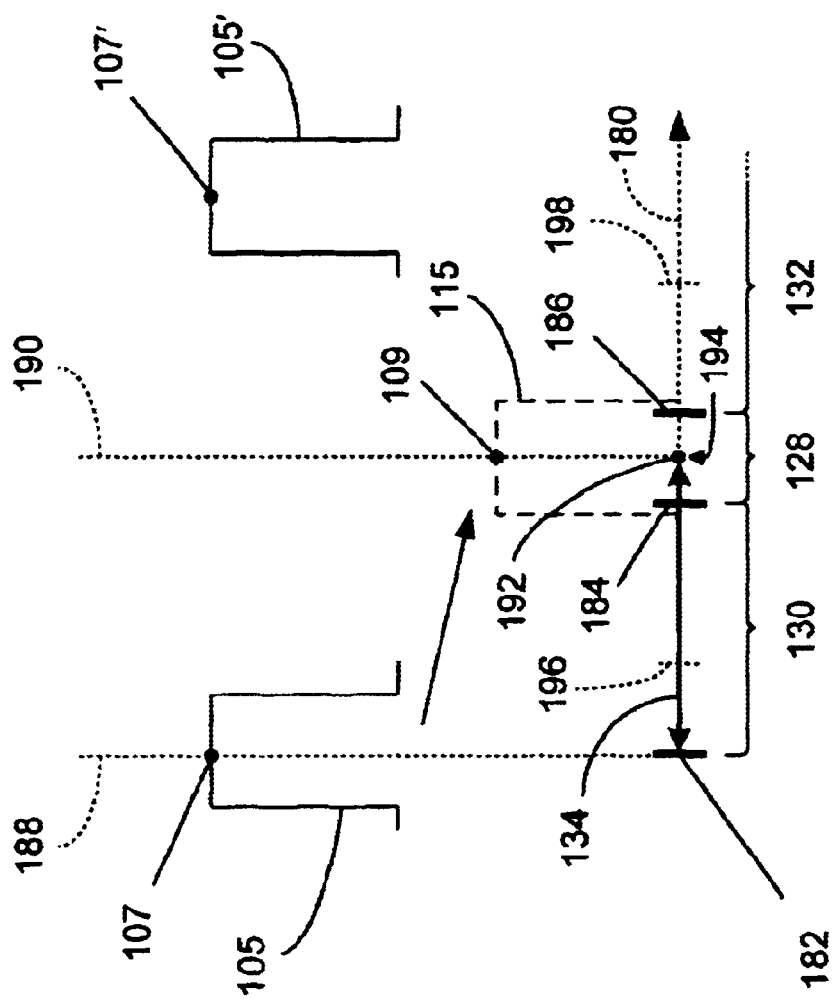
FIG. 14 is a view of a time interval between an input video field and an output video field.

Timer 110 is configured to measure an interval of time, indicated at 134 in FIG. 14, between a predetermined point 107 on an input video field 105 received by the buffer and a corresponding predetermined point 109 on an output video field 115 produced by video generator 112. Predetermined points 107, 109 are shown in the middle of a positive pulse on a square wave only for clarity of explanation. Typically, the predetermined points are respective vertical syncs at the beginning of each of the input and output video fields. Alternatively, virtually any other pair of predetermined reference points may be used, such as a pair of respective horizontal sync pulses. As shown in FIG. 14, each interval 134 is defined relative to a reference frame characterized by an X axis 180. The interval has an origin 182 that is positioned coextensive with the predetermined point 107 on the input video field 105, as indicated by dashed line 188. In addition, interval 134 has a termination point 192 that is coextensive with an analogous predetermined point 109 on output video field 115, as indicated by dashed line 190.

Alternatively, the predetermined points may be at nonanalogous positions within each field, such as at the beginning of the input video field and at the end of the output video field. Furthermore, although the interval 134 typically is measured between consecutive input and output video fields, the interval may span multiple fields. Typically, the interval is measured once per video frame. Alternatively, the interval may be measured more frequently, such as once per field, or less frequently, such as every other frame.

Controller 108 typically is configured to read interval 134 measured by timer 110 and determine whether the magnitude of interval 134 is outside a predetermined range 128, as shown in FIG. 14. The controller makes this determination by detecting whether termination point 192 of interval 134 falls within a lower limit 184 and an upper limit 186 of the predetermined range 128.

Within the predetermined range, the measured interval between the input and output fields is allowed to drift, such that the termination point 192 may drift between the lower limit 184 and upper limit 186. Outside the predetermined range, the controller is configured to alter the timing of the output video stream by skipping or repeating a portion of the output stream, such that the measured interval again will fall within the predetermined range.

The lower limit 184 and upper limit 186 of predetermined range 128 typically are chosen such that the magnitude of the predetermined range is less than the scan time for the viewable pixels in one horizontal line of the display, or approximately 55 microseconds. Thus, a timing correction may be made by skipping or repeating less than one line of the display. Alternatively, predetermined range 128 may be larger or smaller, and the correction may be made by skipping or repeating pixels on more than one line. For example, the predetermined range may be equal to or less than the period of a reference output field produced by the video generator, or equal to or less than the display time for a reference output field, where the timing of reference output field is not altered by the controller.

Controller 108 typically is configured to alter timing of the output stream if termination point 192 of interval 134 drifts outside predetermined range 128. The controller will alter timing if termination point 192 drifts into an upper region 132, which typically extends infinitely upward from the upper limit 186 of the predetermined range, or into a lower region 130, which typically extends from the origin to the lower limit 184 of the predetermined range.

The predetermined range typically is specified by defining a center point of the range measured from the origin, indicated at 194 in FIG. 14, and a positive and negative variation from the center point, defined by upper limit 186 and lower limit 184, respectively. Center point 194 typically is positioned at an arbitrary time point in between the input and output video fields, such that the time distance from the center point to the origin is less than the period of one output field. Alternatively, point 194 may be located at a position other than the center of the predetermined range.

To prevent video tearing, the magnitude of time interval 134 is typically kept above the loading time for the video buffer, which is approximately 5 microseconds. Therefore, a typical minimum value 196 for lower limit 184 is 5 microseconds from origin 182, and a typical maximum value 198 for upper limit 186 is the period of the output video field, measured from point 107 on input field 105 to point 107' on input field 105', minus 5 microseconds. The upper and lower limits may be set to any pair of values within these limits, although typically the upper and lower limits will be no more than the scan time for one horizontal display line apart, as described below. Alternatively, where the interval is measured from nonanalogous points on the input and output video fields, or is measured over multiple fields, or where video tearing will otherwise not occur, the upper and lower limits may exceed these minimum and maximum values.

By way of example only, where it is desired to keep the input and output fields approximately one-half of a video field signal period apart from each other, within a range of plus or minus 10 microseconds, the predetermined range may be set to ½*1/59.94+/−10 microseconds, or 0.00834+/−0.00001 seconds. It will be understood by those skilled in the art that a wide variety of ranges may be selected without departing from the scope of the present invention.

As described above, the predetermined range typically is a time range, measured in seconds or fractions thereof. Alternatively, the predetermined range may be a phase difference range. Where the predetermined range is a phase difference range, measurement circuit 110 typically is configured to detect a phase difference between the input and output streams at the predetermined points on the input and output fields, and the predetermined range typically is set such that the input and output fields will remain at least 5 microseconds out of phase.

Where controller 108 determines that termination point 192 of the interval is above the upper limit of the predetermined range, interval 134 is said to be greater than the predetermined range. Where interval 134 is greater than the predetermined range, the controller is configured to rewrite and raise the value contained in the position indicator. In this way, the video generator will skip transmission of a portion of the video field data in buffer 102 to the output stream. It is desirable to make the timing alteration within one horizontal line of the video field signal, so that no horizontal sync pulses are skipped. Therefore, the controller typically will cause pixel counter 126 to be raised less than a value equivalent to 680 pixels, the number of viewable pixels on a horizontal line. Skipping transmission of a portion of the data effectively accelerates transmission of the video field in the buffer to the output video stream, altering the timing of the output video stream. Skipping transmission shortens the period of the output video field in which skipping occurs and shifts the phase of the output stream backward in time, but does not affect the period of subsequent video field signals.

Referring to FIG. 10, interval 134a between input field 105a and output field 115a falls within predetermined range 128. Therefore, no adjustment is made to the timing of the output stream by controller 108. However, interval 134b between 105b and 115b is greater than the upper limit of the predetermined range 128 and within upper region 132. Because the interval is greater than the predetermined range, controller 108 raises the value in position indicator 123 to accelerate transmission of the video field, thereby causing the field that would have been transmitted at the position indicated by 115b to be transmitted at the position indicated by 115b'.

In FIGS. 10–13, the scale of the shift in positions between output fields, such as between 115b and 115b', is exaggerated for clarity of explanation. Typically, the shift will be only a small fraction of the period of a field, having a length, for example, of a few hundred thousandths of a second. After alteration of the timing at 115b', the accelerated signal, shown by dashed lines at 136, is allowed to drift until controller 108 again detects that the termination point of the interval is outside the predetermined range.

Where controller 108 determines that termination point 192 of the time interval 134 is less than the lower limit of predetermined range 128 and within lower region 130, the interval is said to be less than the predetermined range. Where the interval is less than the predetermined range, the controller is configured to rewrite and lower the value contained in position indicator 123. In this way, the video generator will repeat transmission of a portion of the video field data in buffer 102. Repeating transmission of a portion of the video field effectively delays transmission of the video field from the buffer to the output video stream, altering the timing of the output video stream. Repeating transmission lengthens the period of the output video field in which data is repeated and shifts the phase of the output video stream forward in time, but does not change the period of subsequent video field signals.

Referring to FIG. 11, the interval 134c between input video field 105c and output video field 115c is within the predetermined range 128 and, therefore, no timing alteration is made by controller 108 at this point. However, upon detecting that 134d between 105d and 115d is less than a lower limit of the predetermined range, controller 108 rewrites and lowers a value in position indicator 123 to cause a portion of the input video field 105d to be repeated within the output video field by video generator 112. The result is that the timing of the output stream is delayed, and what would have been field 115d is delayed and shifted to the position indicated by field 115d'. After such alteration of the timing, the signal is allowed to drift until the controller again detects that a subsequent interval is outside the predetermined range.

As shown in FIGS. 10–11, typically the output video field in which unacceptable variance is detected is altered. In this case, the predetermined point 109 for measurement is earlier in the video field signal of the output video field than the portion of the signal that is skipped or repeated.

Figure 12:
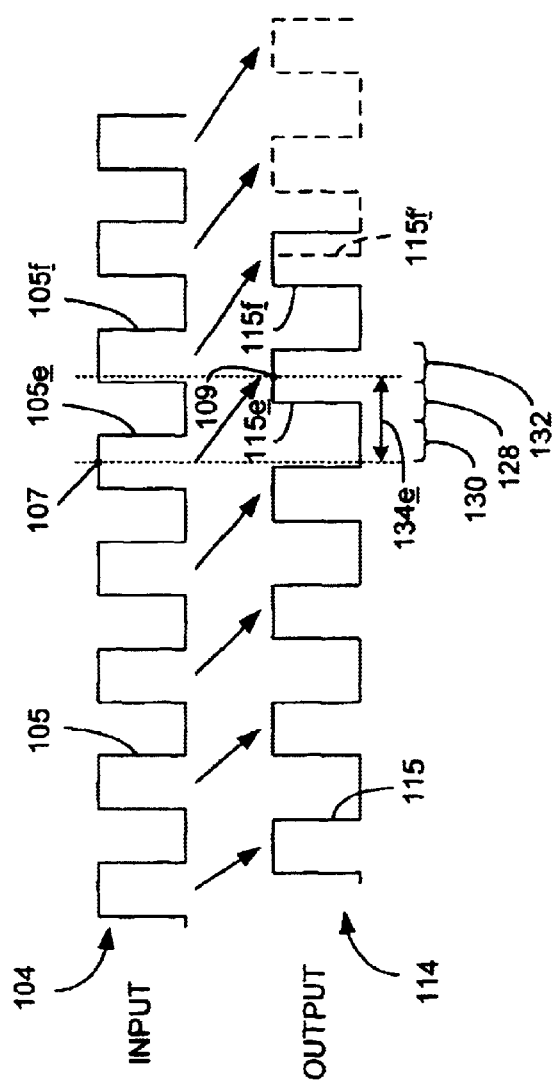
FIG. 12 is view of another output video stream created from an input video stream having a higher frame rate, according to the present invention.

Alternatively, an earlier output video field may be used to measure interval 134, and a portion of a later output video field may be skipped or repeated to alter the tining of the output video stream. In FIG. 12, controller 108 determines that interval 134e between input video field 105e and output video field 115e is outside predetermined range 128. The controller thus raises the position indicator during later output field 115f, thereby skipping a portion of later input field 105f and altering field 1 15f as indicated by the dashed line at 15f . The process is repeated when the controller detects a subsequent interval where the termination point of the interval is outside of the predetermined range 128.

Figure 13:
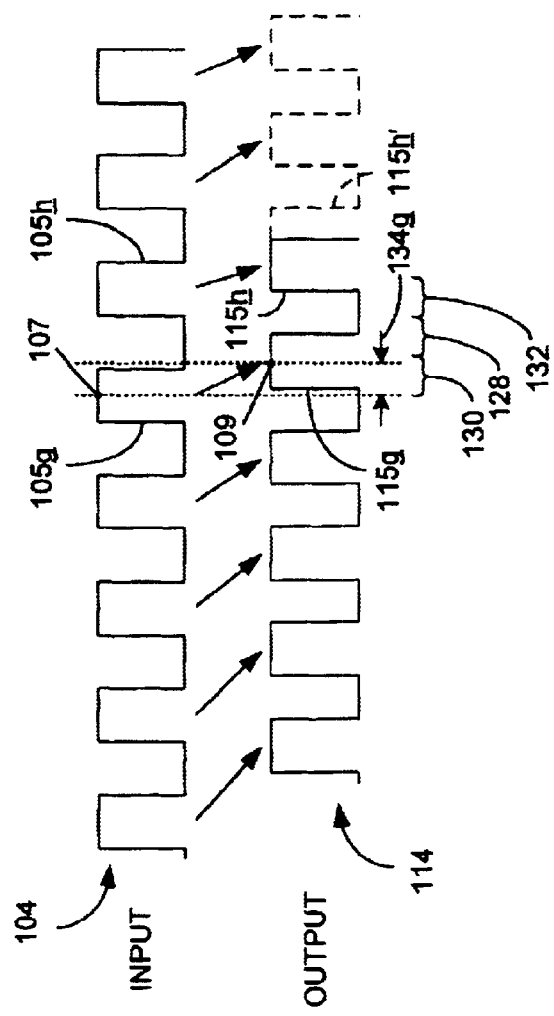
FIG. 13 is view of another output video stream created from an input video stream having a lower frame rate, according to the present invention.

As shown in FIG. 13, a later output field also may be used to delay transmission of the output stream. Controller 108 detects the interval 134g between input video field 105g and output video field 115g is less than a lower limit of predetermined range 128, and thus causes the video generator to repeat a portion of later input field 105h to delay transmission of later output video field 115h to 115h'. The process may be repeated when controller 108 detects a subsequent interval is outside of predetermined range 128.

Typically, controller 108 rewrites position indicator 123 to skip or repeat portions of a buffered input video field in the output video field. Alternatively, controller 108 may directly instruct the video generator 112 to skip or repeat portions of the input video field in the output video field to alter the timing of the output video stream, without using a position indicator.

To avoid any adverse visual effects on the display from the rewriting of the pixel counters and skipping and repeating transmission of video field data from the buffer to the output stream, the timing alteration described above is typically made within a nonviewable portion of the output video field signal. Referring again to FIG. 1, the timing alteration typically is made on the first line 38 after the last viewable line 36 in the output video field signal. As described above, line 38 may be in an overscan region near the end of the output video field, or may be during a vertical blanking interval 18. The timing alteration is made before the vertical sync pulse 20 of the next output video field such that the display device is able to resynchronize quickly with the vertical sync pulse and adjust to the new, altered timing of the output video stream. By doing so, the timing alteration does not interfere with closed captioning information contained after the vertical sync pulse, nor with the viewable picture information at the top of the next output video field. Alternatively, the timing alteration may be made elsewhere in the vertical blanking interval, or during some other nonviewable portion of the video field, such that no effect is visible on the display.

Figure 15:
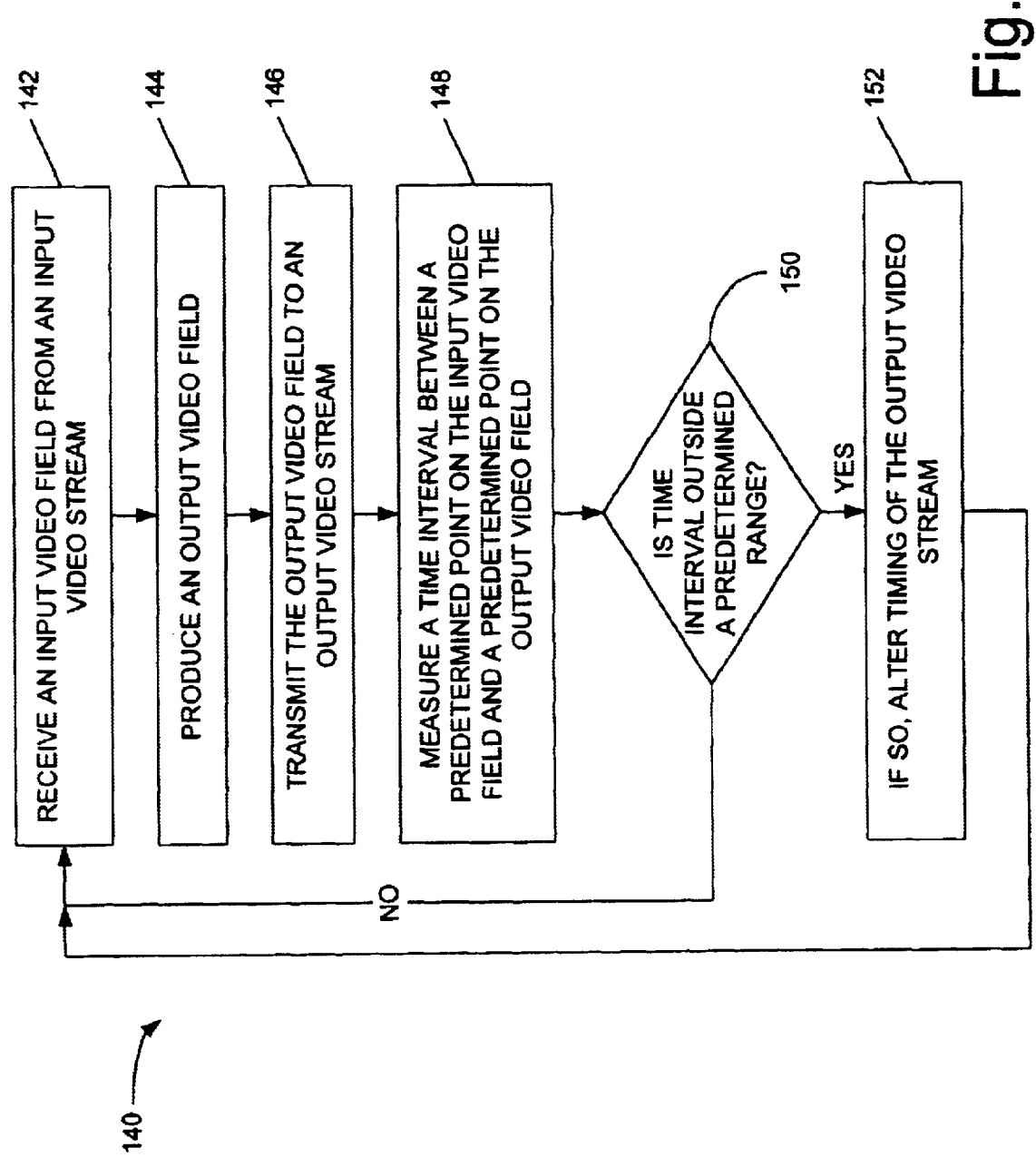
FIG. 15 is a flowchart of a video timing method according to the present invention.

According to the present invention, a method 140 for producing an output video stream from an input video stream may be practiced as indicated in FIG. 15 at 140. At 142, the method includes receiving from an input video stream, an input video field in a buffer. At 144, the method further includes producing an output video field based on an input video field from the input video stream. Typically, the output video field is based on the current input video field. Alternatively, the output video field may be based on an earlier or later input video field in the input video stream.

At 146, the method includes transmitting at least part of the output video field to the output video stream. At 148, the method includes measuring a time interval between a predetermined point on the input video field received at 142 and a predetermined point on the output video field transmitted at 146, and at 150, determining whether the measured interval is outside a predetermined range. Typically, the predetermined points are respective vertical sync pulses on each of the input and output video fields. Alternatively, virtually any other analogous or nonanalogous pair of predetermined points within the input and output fields may be used.

Figure 16:
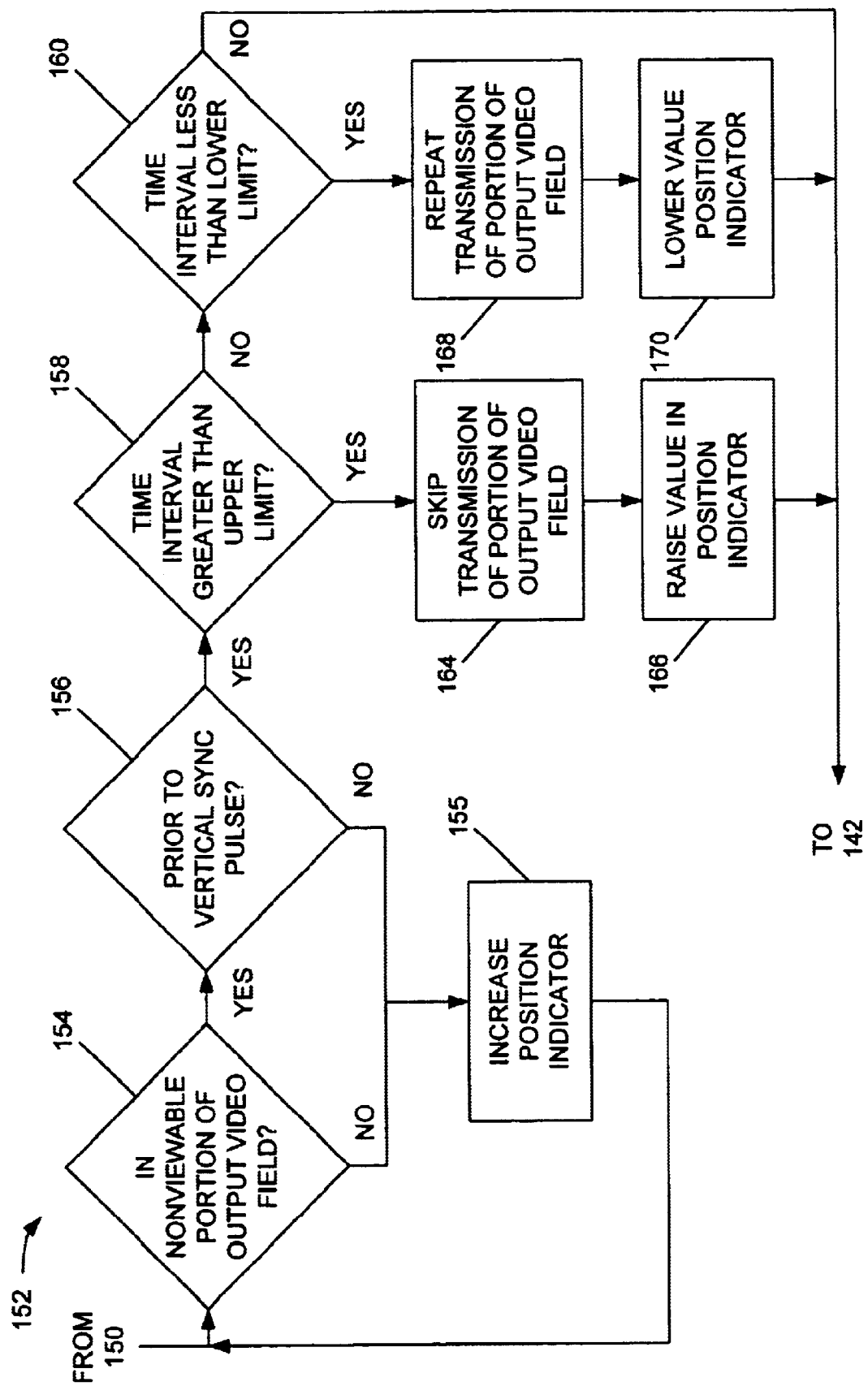
FIG. 16 is a detail flowchart of a portion of the video timing method of FIG.

At 152, if the time interval is outside the predetermined range, the method includes altering timing of the output video stream. As shown in FIG. 16, altering timing may include at 154, determining whether the position indicator is in a nonviewable portion of the output video field. As described above, this may be during overscan lines of a video field signal, or during the vertical blanking interval. If so, at 156 the method further may include determining whether the position indicator is prior to a vertical sync pulse of a later output video field. Making a timing alteration prior to a vertical sync pulse enables the display to resynchronize itself quickly with the vertical sync pulse after the timing alteration, and avoid any interference with closed captioning or picture information. If the position indicator is not within a nonviewable portion and prior to a vertical sync pulse, then at 155 the method includes increasing a value in the position indicator according to the internal clock associated with the video generator.

If the position indicator is within a nonviewable portion and prior to a vertical sync pulse, at 158 the method further includes determining whether the time interval measured at 148 is greater than an upper limit of the predetermined range. If greater than the upper limit, at 164 the method typically includes accelerating transmission of the output video field in the output video stream. This is accomplished by skipping transmission of a portion of the output video field. As shown at 166, skipping typically is accomplished by raising a value in the position indicator associated with the video generator.

If the time interval is not greater than the upper limit, at 160 the method further includes determining whether the time interval is less than a lower limit of the predetermined range. If so, at 168 the method typically includes delaying transmission of the output video field in the output video stream. This is accomplished by repeating a portion of the output video field. As shown at 170, repeating typically is accomplished by lowering the value in the position indicator associated with the video generator. It will be appreciated that determining whether the position indicator is in a nonviewable portion of the output video field may take place at any time prior to raising or lowering the value in the position indicator. It will also be appreciated that determining whether the time interval is greater than an upper limit or less than a lower limit of the predetermined range may occur at 150, or at some other time after the time interval is measured.

According to the above-described invention, a system and method for creating an output video stream based on an input video stream having an independent time base may be practiced. The invented system and method may be used to reduce video tearing, while utilizing less buffer memory than prior art time base correctors, and without the "jerky" motion caused by dropping and repeating frames.

While the invention has been disclosed in its preferred form, the specific embodiments thereof as disclosed and illustrated herein are not to be considered in a limiting sense, because numerous variations are possible. The subject matter of the invention includes all novel and non-obvious combinations and subcombinations of the various elements, features, functions, and/or properties disclosed herein. No single feature, function, element, or property of the disclosed embodiments is essential. The following claims define certain combinations and subcombinations which are regarded as novel and non-obvious. Other combinations and subcombinations of features, functions, elements, and/or properties may be claimed through amendment of the present claims or presentation of new claims in this or a related application. Such claims also are regarded as included within the subject matter of the present invention irrespective of whether they are broader, narrower, or equal in scope to the original claims.

What is claimed is:

1. A method for producing an output video stream from an input video stream, the method comprising:
   receiving from the input video stream an input video field in a video buffer;
   selecting a predetermined point in the input video field;
   transmitting at least a portion of an output video field from the video buffer to the output video stream;
   selecting a predetermined point in the output video field that corresponds with the predetermined point selected in the input video field;
   measuring a time interval between the selected predetermined points;
   determining whether the time interval is outside a predetermined range; and whenever it is determined that the time interval is outside the predetermined range, altering timing of the output video stream to compensate by skipping or repeating a portion of the output streain, such that the measured interval will thereafter fall within the predetermined range.

2. The method of claim 1, where delaying includes repeating transmission of a part of the output video field.

3. The method of claim 2, where repeating is accomplished by lowering a value in a position indicator associated with the video buffer.

4. The method of claim 3, where the position indicator includes a pixel counter, and repeating is accomplished by lowering a value in the pixel buffer.

5. The method of claim 1, where accelerating includes skipping transmission of part of the second video field.

6. The method of claim 5, where skipping is accomplished by raising a value in a position indicator associated with the video buffer.

7. The method of claim 6, where the position indicator includes a pixel counter, and skipping is accomplished by raising a value in the pixel counter.

8. The method of claim 1, where altering is accomplished within a portion of the output video field that is not viewable on a video display.

9. The method of claim 8, where altering is accomplished before a vertical sync pulse in a later output video field.

10. The method of claim 8, where altering is accomplished during a vertical blaming interval in the output video field.

11. The method of claim 8, where altering is accomplished during an overscan line in the output video field.

12. The method of claim 8, where altering is accomplished on the first line after the last viewable line of the output video field.

13. The method of claim 1, where measuring the time interval between the first predetermined point and the second predetermined point includes measuring a time interval between receiving the input video field in the video frame buffer and transmitting the output video filed in the output video stream.

14. The method of claim 1, where the first predetermined point is a vertical sync pulse.

15. The method of claim 1, where the second predetermined point is created from a vertical sync pulse.

16. The method of claim 1, where the output video field is created from the input video field.

17. The method of claim 1, where altering includes accelerating transmission of a portion of a later output video field in the output video stream.

18. The method of claim 1, where altering includes delaying transmission of a portion of a later output video field in the output video stream.

19. The method of claim 1, were the predetermined range is less than or equal to the period of a reference output video filed in the output video stream.

20. The method of claim 1, where selecting a predetermined point in the input video field comprises selecting a point that is within a static portion of a waveform.

21. The method of claim 1, where selecting a predetermined point in the input video field comprises selecting a point that is nonanalogous to the predetermined point in the output video field.

22. A system comprising:
a video buffer configured to store an input video field from an input video stream;
a video generator coupled to the video buffer, the video generator being configured to generate an output video field based on the input video field and transmit the output video field in an output video stream;
a timer associated with the video buffer, the timer being configured to measure a time interval between a fist arbitrarily selected point on the input video field and a second arbitray selected point on the output video field; and
a controller associated with the timer, the controller being configured to alter the timing of the output video stream in whenever it is determined that the time interval is outside an arbitrarily selected range.

23. The system of claim 22, where the timer is configured to measure the time interval between receipt of the input video field in the buffer and transmission of the output video field in the output video stream.

24. The system of claim 22, where at least one of the arbitrarily selected points is a vertical sync pulse.

25. The system of claim 22, further comprising:
a counter associated with the video generator, the counter being configured to hold a value, where the value indicates a portion of an input video field to transmit to the output video stream;
where the controller is configured to raise the value in the counter when be time interval is greater than the predetermined range, thereby causing the video generator to kip transmission of a portion of the input video field to the output video stream.

26. The system of claim 25, where the portion of the output video field skipped by the video generator is not viewable on a video display.

27. The system of claim 25, where the portion of the output video field skipped by the video generator is on an overscan line of the output video field.

28. The system of claim 25, where the portion of the output video field repeated by the generator is on a first line after the last viewable line in the output video field.

29. The system of claim 25, where the portion of the output video field skipped by the video generator is before a vertical sync pulse in a subsequent output video field in the output video stream.

30. The system of claim 25, where the portion of the output video field skipped by the video generator is within a vertical blanking interval in the output video field.

31. The system of claim 22, further comprising:
counter associated with the video generator, the counter being configured to hold a value, where the value indicates a portion of an input video field to transmit to the output video stream;
where the controller is configured to lower the value in the counter when the time interval is greater than predetermined range, thereby causing the video generator to repeat transmission of a portion of the input video field to the output video stream.

32. The system of claim 31, where the portion of the output video field repeated by the video generator is not viewable on a video display.

33. The system of claim 31, where the portion of the output video field repeated by the video generator is on an overscan line in the output video field.

34. The system of claim 31, where the portion of the output video field repeated by the video generator is on a first line after the last viewable line in the output video filed.

35. The system of claim 31, where the portion of the output video field repeated by the video generator is before a vertical sync pulse in a subsequent output video field in the output video stream.

36. The system of claim 31, where the portion of the output video field repeated by the video generator is within a vertical blanking interval in the output video field.

37. The system of claim 30, where the video generator is configured to skip a portion of a later output video field in the output video stream if the time interval is greater than the arbitrarily selected range.

38. The system of claim 37, where the portion of the later output field to be skipped is nonviewable.

39. The system of claim 32, where the video generator is configured to repeat a portion of a later output video field in the output video stream if the time interval is less than the arbitarily selected range.

40. The system of claim 33, where the portion of the later output field to be repeated is nonviewable.

41. A method for producing an output video stream from an input video stream, the method comprising:

receiving from the input video stream an input video field in a video buffer;

selecting a predetermined point in the input video field;

transmitting at least a portion of an output video field from the video buffer to the output video stream;

selecting a predetermined point in the output video field that corresponds with the predetermined point selected in the input video field;

measuring a time internal between the selected predetermined points;

determining whether the time interval is outside a predetermined range;

if the time interval is outside the selected range, altering timing of the output video stream to compensate by skipping or repeating a portion of the output stream, such that the measured interval will thereafter fall within the predetermined range;

selecting a second predetermined point in the input video field;

measuring a second time interval between the second predetemined point and the predetermined point of the output video field;

determning if the timing of the output video stream should be altered based on the second time interval.

42. A method for producing an output video stream from an input video stream, the method comprising:

receiving from the input video stream an input video field in a video buffer, selecting a predetermined point in the input video field;

transmitting at least a portion of an output video field from the video buffer to the output video stream;

selecting a predetermined point in the output video field that responds with the predetermined point selected in the input video field, wherein the predetermined points in the input video field and output video field are selected from reference points other than vertical syncs and horizontal syncs;

measuring a time interval between the selected predetermined points;

determining whether the time interval is outside a predetermined range; and if the time intenral is outside the selected range, altering timing of the output video stream to compensate by skipping or repeating a portion of the output stream, such that the measured interval will thereafter fall within the predetermined range.

43. The method of claim 42, where selecting a predetermined point in the input video field comprises selecting a point that is within a static portion of a waveform.

44. The method of claim 42, wherein the predetermined points comprise nonanalogous positions within the input and output video fields.

45. The method of claim 42, where altering includes:

if the time interval is greater than an upper limit of the arbitrarily selected range, accelerating transmission of the output video field in the output video stream; and if the time interval is less than a lower limit of the arbitrarily selected range, delaying tramsission of the output video field in the output video stream.

46. The method of claim 42, where altering occurs in a nonviewable portion of the output video stream.

47. The method of claim 42, where altering occurs on an overscan line of the output video stream.

48. The method of claim 42, where altering occurs before a vertical sync pulse of the output video stream.

49. The method of claim 42, where altering occurs in a vertical blanking interval of the output video stream.

* * * * *

UNITED STATES PATENT AND TRADEMARK OFFICE
CERTIFICATE OF CORRECTION

PATENT NO. : 6,636,269 B1
DATED : October 21, 2003
INVENTOR(S) : James A. Baldwin It is certified that error appears in the above-identified patent and that said Letters Patent is hereby corrected as shown below:

Column 3,
Line 19, after "that has" please change "bee" to -- been --
Line 22, after "corrector" please insert -- will --

Column 4,
Line 17, after "FIG. 12 is" please insert -- a --
Line 20, after "FIG. 13 is" please insert -- a --
Line 27, after "FIG. 16 is a" please delete "detail" and insert -- detailed --
Line 34, after "is shown at" please insert -- 10. --

Column 5,
Line 1, after "sync pulse" please insert -- 20, --

Column 7,
Line 62, after "of the" please delete "intputand" and insert -- input and --
Line 66, after "134 is" please change "defmed" to -- defined --

Column 10,
Line 43, after "alter the" please change "tining" to -- timing --
Line 50, after "line at" please change "15f" to -- 115f ' --

Column 13,
Line 4, after "output" please change "streain" to -- stream --
Line 29, after "vertical" please change "blaming" to -- blanking --
Line 54, after "claim 1," please change "were" to -- where --
Line 56, before "in the output" please change "filed" to -- field --

Column 14,
Line 4, after "between a" please change "fist" to -- first --
Line 6, after "second" please change "arbitray" to -- arbitrarily --
Line 10, before "whenever it is" please remove "in"
Line 24, after "counter when" please change "be" to -- the --
Line 26, after "to" please change "kip" to -- skip --
Line 62, after "output video" please change "filed" to -- field --

UNITED STATES PATENT AND TRADEMARK OFFICE
CERTIFICATE OF CORRECTION

PATENT NO.    : 6,636,269 B1
DATED         : October 21, 2003
INVENTOR(S)   : James A. Baldwin It is certified that error appears in the above-identified patent and that said Letters Patent is hereby corrected as shown below:

Column 15,
Line 13, before "selected range" please change "arbitarily" to -- arbitrarily --
Line 26, after "a time" please change "internal" to -- interval --
Line 39, after "video field;" please insert -- and --
Line 40, before "if the timing" please change "determning" to -- determining --

Column 16,
Line 16, after "if the time" please change "intenral" to -- interval --

Signed and Sealed this

Thirteenth Day of July, 2004

JON W. DUDAS
*Acting Director of the United States Patent and Trademark Office*